(12) United States Patent
Vasshus et al.

(10) Patent No.: US 9,399,896 B2
(45) Date of Patent: Jul. 26, 2016

(54) SIEVE DEVICE FOR UNTREATED DRILLING MUD AND A METHOD OF USING SAME

(75) Inventors: Jan Kristian Vasshus, Sandnes (NO); Arne Malmin, Kleppe (NO)

(73) Assignee: Cubility AS, Sandnes (NO)

( * ) Notice: Subject to any disclaimer, the term of this patent is extended or adjusted under 35 U.S.C. 154(b) by 386 days.

(21) Appl. No.: 13/809,241

(22) PCT Filed: Jun. 27, 2011

(86) PCT No.: PCT/NO2011/000185
§ 371 (c)(1),
(2), (4) Date: Jan. 14, 2013

(87) PCT Pub. No.: WO2012/008844
PCT Pub. Date: Jan. 19, 2012

(65) Prior Publication Data
US 2013/0112631 A1    May 9, 2013

(30) Foreign Application Priority Data

Jul. 15, 2010    (NO) .................................. 20101011

(51) Int. Cl.

| | | |
|---|---|---|
| *C02F 1/00* | (2006.01) | |
| *E21B 21/00* | (2006.01) | |
| *B03B 5/00* | (2006.01) | |
| *E21B 21/06* | (2006.01) | |
| *B01D 41/00* | (2006.01) | |
| B01D 39/08 | (2006.01) | |
| B01D 46/00 | (2006.01) | |

(52) U.S. Cl.
CPC .............. *E21B 21/065* (2013.01); *B01D 41/00* (2013.01); *B01D 39/08* (2013.01); *B01D 46/0019* (2013.01); *B01D 46/0023* (2013.01); *B01D 46/0057* (2013.01); *B01D 2311/14* (2013.01); *B01D 2321/40* (2013.01); *E21B 21/06* (2013.01)

(58) Field of Classification Search
None
See application file for complete search history.

(56) References Cited

U.S. PATENT DOCUMENTS 3,464,557 A    9/1969  Fowler
3,563,255 A  * 2/1971  Morris .......................... 134/133

(Continued)

FOREIGN PATENT DOCUMENTS

NO    323519 B1    4/2007
NO    326594 B1    1/2009

(Continued)

*Primary Examiner* — Nam Nguyen
*Assistant Examiner* — Richard Gurtowski
(74) *Attorney, Agent, or Firm* — Gable Gotwals (57) ABSTRACT

A sieve device (1) for untreated drilling mud being brought up from a well and a method for use is provided. The sieve device (1) has a filter device (3) to separate a share of the drilling liquid from the drill cuttings. The sieve device (1) connects to a first outlet that receives drilling cuttings held back on the filter device (3) and a second outlet (11) that receives drilling liquid flowing from the filter device (3). The sieve device (1) also has at least one secondary filter (13) to separate drill cuttings from drilling liquid, a filter guard (17) being arranged in connection with the secondary filter (12), and a bypass arrangement (19) by means of which the filter guard (17) is arranged to open for communication of untreated drilling mud held back on the secondary filter (13), into the second outlet (11) for drilling liquid.

6 Claims, 6 Drawing Sheets

(56) References Cited

U.S. PATENT DOCUMENTS

| | | | | |
|---|---|---|---|---|
| 3,849,313 | A | * | 11/1974 | Lopker ........................ 210/400 |
| 3,911,741 | A | * | 10/1975 | Rochon et al. ............. 73/152.19 |
| 3,963,605 | A | * | 6/1976 | Seabourn .......................... 209/2 |
| 5,454,957 | A | | 10/1995 | Roff, Jr. |
| 6,530,482 | B1 | * | 3/2003 | Wiseman ...................... 209/253 |

| 2010/0089652 | A1 | 4/2010 | Burnett |

FOREIGN PATENT DOCUMENTS

| WO | 9608301 | A1 | 3/1996 |
|---|---|---|---|
| WO | 2006092634 | A1 | 9/2006 |

\* cited by examiner

SIEVE DEVICE FOR UNTREATED DRILLING MUD AND A METHOD OF USING SAME

CROSS-REFERENCE TO RELATED APPLICATIONS

This application is the United States National Phase of PCT Patent Application No. NO2011/000185 filed on 27 Jun. 2011, which claims priority to Norwegian Patent Application No. 20101011 filed 15 Jul. 2010, both of which are incorporated herein by reference.

The present invention relates to a sieve device. More particularly it concerns a sieve device for untreated drilling mud brought up from a well, and a method for using the sieve device, where the sieve device is provided with a filter device arranged to separate a share of the drilling liquid from the drill cuttings, and where the sieve device is connected to a first outlet arranged to be able to receive the drill cuttings held back on the filter device, and a second outlet arranged to be able to receive the drilling liquid which has been flowing through the filter device and has been directed to the second outlet through a channel.

Drilling of wells in the oil and gas industry brings large quantities of untreated drilling mud out of the well and up to the earth surface or up to an offshore drilling rig. The untreated drilling mud contains fragments of drilled earth formations and drilling liquid or drilling mud and also any other fluids flowing into the well from the formation surrounding the well. The drilling liquid is circulated into the well. The drilled earth formations are termed drill cuttings. By drill cuttings is in this document meant solid material exceeding a predetermined particle size decided by the mesh size of the filter device.

A person skilled in the art will be familiar with the drilling liquid having several functions, among which are lubricating and cooling of the drill bit used in the drilling operation, carrying the drill cuttings out of the well bore, and being a weight agent for well control.

The drilling liquid may be very expensive. For this reason, among others, there is a desire to recycle the drilling liquid being circulated out from the well together with the drill cuttings. To separate valuable drilling liquid from the drill cuttings, the use of sieve devices in the art known as "shale shakers" is common. These are large screening machines including one or more filter devices in the form of clamped screen cloths being vibrated by means of, as an example, one or more displaced clump weights.

The present applicant has developed and described in Norwegian Patent NO323519 a sieving apparatus for screening and separation of fluid from a material containing fractions of a solid and a fluid, the material being placed on a topside of the at least one screening element including an endless screening cloth arranged to be moved about at least two mutually spaced apart turning rollers, the apparatus including at least one suction nozzle directed up against an underside of the endless screening cloth. The screening cloth thus rotates about two spaced apart turning rolls and the intended separation is provided by means of airflow instead of vibrating a stationary sieve by means of displaced, clump weights. The apparatus is sold under the trademark "MudCube®".

By use of the screening apparatuses the screening cloths are exposed to a considerable wear and they will be worn to pieces if they are not replaced within a given period of use. The wear is particularly large for a screening cloth used in the above vibratory screening apparatus or shale shaker.

When a screening cloth is worn to pieces, for example by a hole appearing in the screening cloth, solid particles otherwise being held back by the screening cloth, will stay mixed with the drilling liquid to be reused in the well. The drilling liquid to be reused in the well is also called return liquid in the trade.

In use the shale shaker screening cloth will normally be covered by untreated drilling mud supplied to the screening cloth. Thus it has turned out to be very difficult to detect defects in the screening cloth prior to sampling of the return liquid. Such samples are taken at set intervals by a so-called "Mud-logger". By the very fact that sampling is not continuous, solid particles of a size exceeding the screen mesh width may for a certain period of time be returned uncontrolled to the well.

To be able to detect defects in the rotating screening cloth in the MudCube®, the applicant has earlier arranged an additional stationary filter in connection with the MudCube®. When the filter is clogged by material passing the rotating screening cloth as a consequence of damage to this, a filter guard will cause the supply of untreated drilling mud to the MudCube® to be stopped such that it is not flooded by untreated drilling mud.

Even if the above explained additional stationary filter prevents untreated drilling mud from being conveyed to the return liquid, an automatic stop of supply to the screening device may create problems for the process upstream of the screening device.

Further background technology is known from the publication US 2010/0809652 describing a sieve device having at least two filters with a system for controlling inflow of drilling fluid to each filter.

From the publication WO 96/08301 is known a control unit controlling the flow of drilling fluid to a screening machine by controlling the fluid level in a tank by means of a gate valve.

From the publication WO 2006/092634 is known to control fluid level on the filter in each section and to keep the weight of fluid on the filter under control such that a vibration mechanism gets an even loading.

The object of the invention is to remedy or reduce at least one of the disadvantages of the prior art, or at least to provide a useful alternative to the prior art.

The object is achieved by the features disclosed in the below description and in the subsequent claims.

According to a first aspect of the present invention there is provided a sieve device for untreated drilling mud containing drilling fluid and drill cuttings being brought up from a well, where the sieve device is provided with a filter device arranged to separate a share of the drilling liquid from the drill cuttings, and where the sieve device is connected to a first outlet arranged to be able to receive the drill cuttings held back on the filter device, and a second outlet arranged to be able to receive the drilling liquid flowing through the filter device and being directed to the second outlet via a channel, where the sieve device is further provided with:
- at least one secondary filter arranged to be able to separate drill cuttings from drilling liquid, where the secondary filter is arranged in said channel in such a way that drilling liquid is lead through the filter and on to said second outlet;
- a filter guard arranged in connection with the secondary filter; and
- a bypass arrangement which by means of the filter guard is arranged to be able to open for communication of untreated drilling mud withheld on/by the secondary filter, into said second outlet for drilling liquid.

By arranging for bypass of untreated drilling mud intercepted by the secondary filter, the process upstream of the sieve device will not be affected by breakage or damages to the filter device.

The filter guard may be arranged to give a signal to for example an operator before the bypass arrangement is opened as a consequence of held back untreated drilling mud on the secondary filter. An operator may thereby in a controlled manner be able to make a decision about stopping the supply of untreated drilling mud to the sieve device by, for example, rerouting the supply to another sieve device, or if untreated drilling mud and not only drilling liquid shall be allowed to flow into the return liquid.

The signal from the filter guard may for example be initiated as a consequence of weight and/or volume of the mass being held back on the secondary filter.

In one variation of the sieve device of the present applicant, underpressure is used to suck fluids through the rotating filter device. By using such suction the filter guard may, as an alternative or addition to said filter guard based on weight and/or volume, be based on monitoring of a pressure differential between an upstream and a downstream side of the secondary filter. Such monitoring has turned out to be particularly useful in giving an early warning about the secondary filter filling up with untreated drilling mud.

The secondary filter may have a mesh width corresponding to the mesh width of the filter device. The secondary filter will thereby hold back solid particles having a size exceeding the mesh width of the filter device.

In an alternative embodiment the secondary filter may have a mesh width somewhat larger, for example 25% larger, than the mesh width of the filter device. The effect of this is that the filter may let some particles through which should have been held back by the filter device, but where the particles are not of such a size that they are able to create problems for use of the return liquid, as long as they are supplied in limited amounts. By use of such a larger mesh width it will take somewhat longer for the secondary filter to get clogged.

In a second aspect of the invention there is provided a method to have control of the integrity of a filter device in a sieve device arranged to separate a share of a drilling liquid in an untreated drilling mud from drill cuttings in the untreated drilling mud, and where the sieve device is connected to a first outlet arranged to be able to receive the drill cuttings being held back on the filter device, and a second outlet arranged to be able to receive the drilling liquid flowing through the filter device and being directed to the second outlet via a channel, where the method further includes the steps of:

placing at least one secondary filter in said channel;
registering untreated drilling mud being held back on or by the secondary filter; and
when the quantity of untreated drilling mud being held back on or by the secondary filter exceeds a limit value, or fluid flow through the secondary filter becomes less than a limit value, opening for communication of the untreated drilling mud between an upstream side of the secondary filter and the second outlet.

In the following is described an example of a preferred embodiment illustrated in the accompanying drawings, where.

The Figures are only to be regarded as principle sketches where only elements important for the understanding of the present invention are shown. Moreover, only elements discussed in the following description are indicated by reference numerals.

Position reports such as "over" and "under" refer to positions relative to the Figures and to positions relevant in the usage positions of the apparatus.

Figure 1:
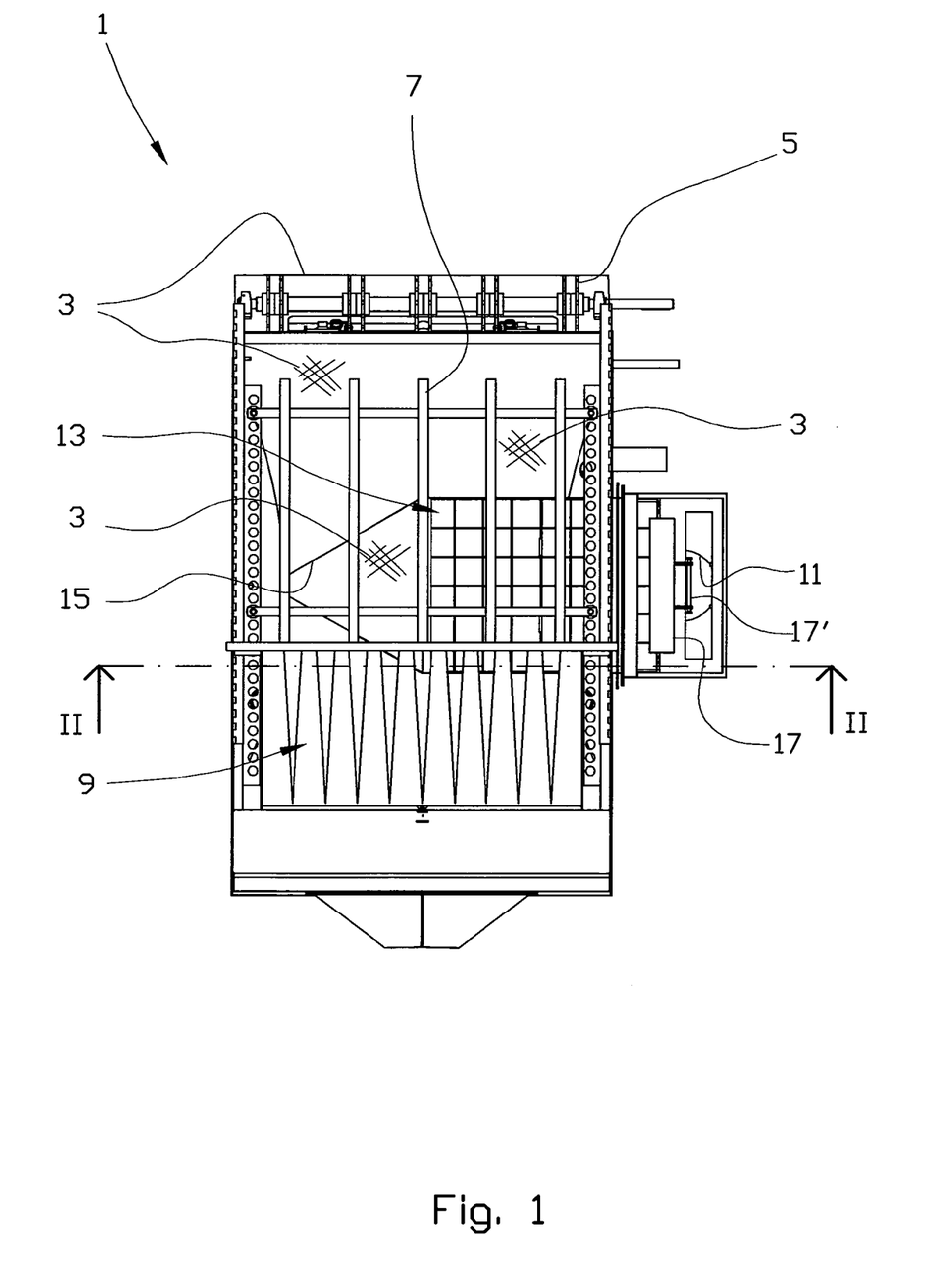
FIG. 1 shows a top view of a sieve device, where the sieve device is of the kind being constituted by a rotating screening cloth.

In the Figures the reference numeral 1 indicates a sieve device including a filter device in the form of a filter cloth 3. For the sake of clarity the filter cloth 3 in FIG. 1 is only indicated by hachure in three places, but it is to be understood that the filter cloth 3 extends over turning rollers 5 arranged at each end portion of the sieve device 1. The turning rollers 5 are in FIG. 1 only visible in one of the end portions of the sieve device 1.

In use the turning rollers 5 rotate and bring along the filter cloth 3. Between the turning rollers 5 the filter cloth 3 is carried glidingly against five longitudinal supporting elements 7.

Untreated drilling mud including drilling liquid and solid particles in the form of drill cuttings, are led from a supply portion 9 and onto the filter cloth 3. The drilling liquid may also contain fluids that may flow into the well from the surrounding formations.

The sieve device 1 shown in the Figures is a development of a sieve device described in said Norwegian Patent NO323519 by the applicant and in the publication WO 2007/004889. The publications describe, as mentioned above, an apparatus of the kind that separates a share of the drilling liquid from the drill cuttings by means of an airflow directed through the cloth in such a way that the airflow directs a considerable share of the liquid fraction of the contaminated drilling mud through the filter cloth 3, while drill cuttings larger than the mesh width of the filter cloth 3, are withheld and brought to a first outlet (not shown) located in an end portion at a turning roller 5. The airflow is provided by means of an underpressure-generating device (not shown) in fluid communication with a second outlet 11.

A secondary filter 13 is arranged in connection with a chute or channel 15 leading drilling liquid having passed the filter cloth 3 further on to the second outlet 11.

Figure 2:
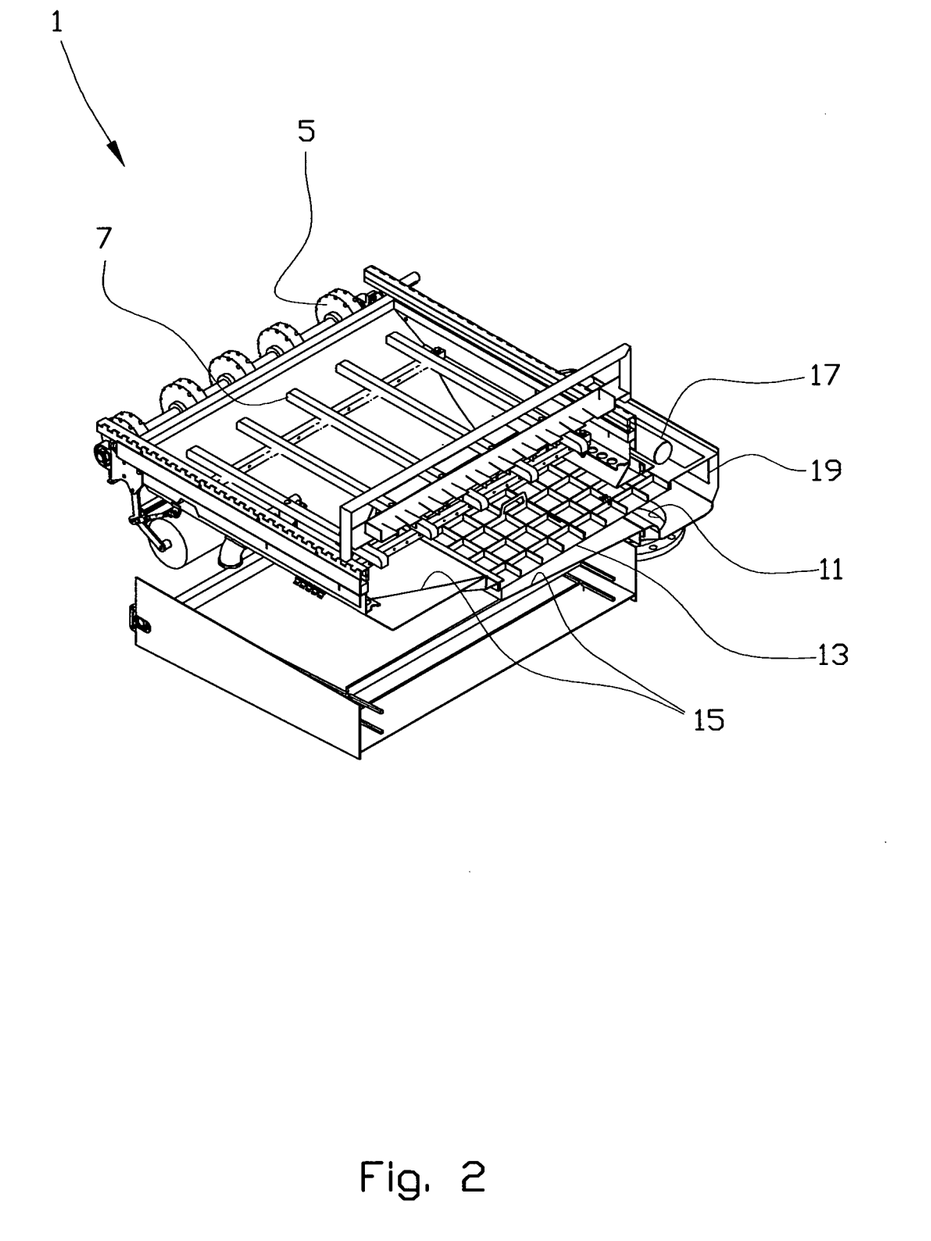
FIG. 2 shows a perspective view of a portion of the sieve device in FIG. 1 seen through the section 2-2 obliquely from above, but where the screening cloth is not shown.

By placing the secondary filter 13 integrated in the channel 15 as shown in FIG. 2, the secondary filter 13 will not take up further space in for example a drilling rig. Thus the secondary filter 13 does not occupy further area or "footprint" than what is already occupied by the sieve device 1. It is however to be understood that in alternative embodiments the secondary filter 13 may be placed wholly or partly separate from the sieve device 1.

As long as the integrity of the filter cloth 3 is intact, the secondary filter 13 will only receive drilling liquid. The secondary filter 13 has preferably a mesh size at least as large as the mesh size of the filter cloth 3. The drilling liquid will thus also pass through the secondary filter 13 and flow on, as return liquid. in the channel 15 and out through the second outlet 11.

If damage occurs in the filter cloth 3, such as a hole or a tear, the filter cloth 3 will also let through drill cuttings of a size exceeding the filter cloth's 3 mesh size. These drill cuttings will, together with the drilling liquid, be led over the secondary filter 13.

The secondary filter 13 will hold back drill cuttings of a size exceeding the secondary filter 13 mesh size. Drill cuttings will thus gradually fill up the secondary filter 13.

Figure 3:
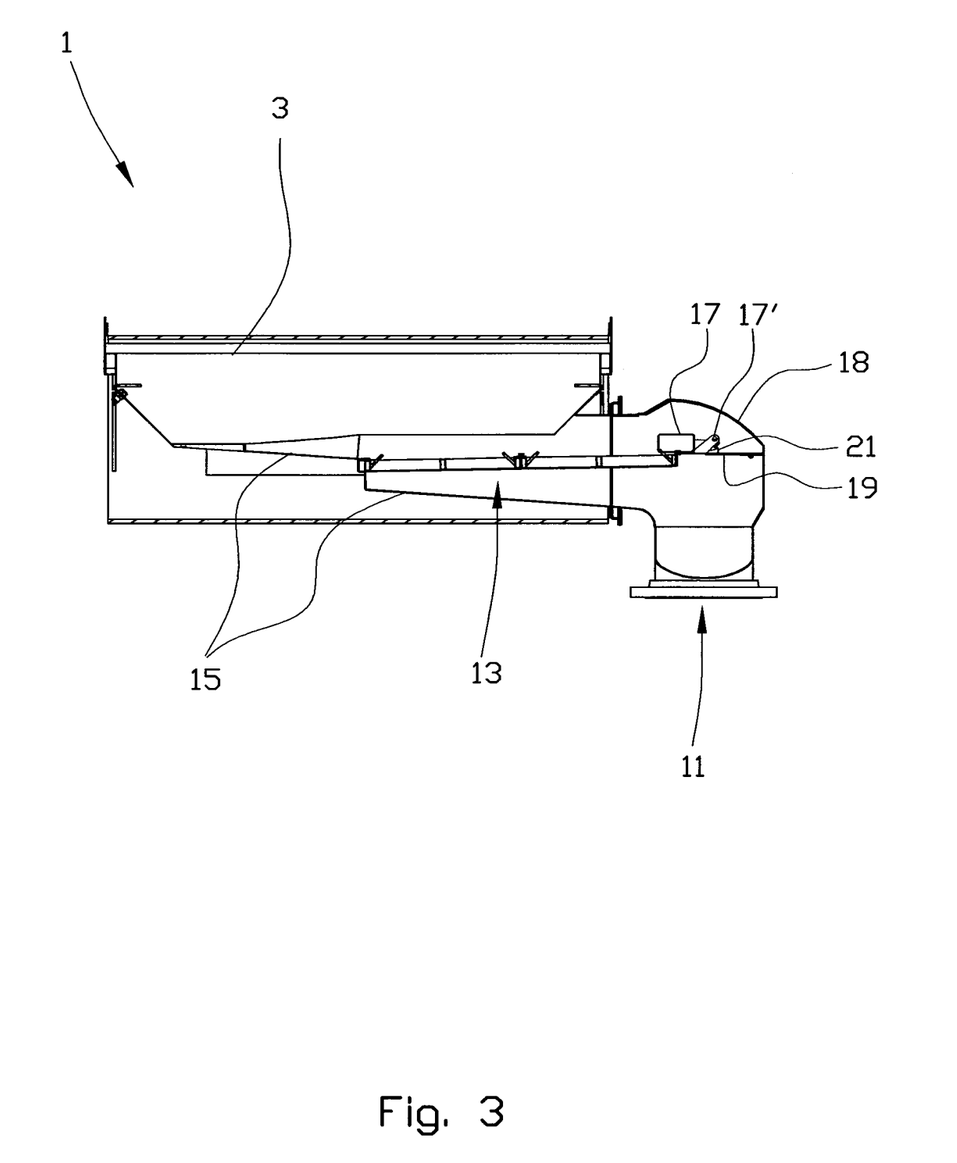
FIG. 3 shows a sectional view of the sieve device in FIG. 1 seen through the line 2-2, where the sieve device is provided with a secondary filter and a filter guard in a closed or inactive position.
Figure 6A:
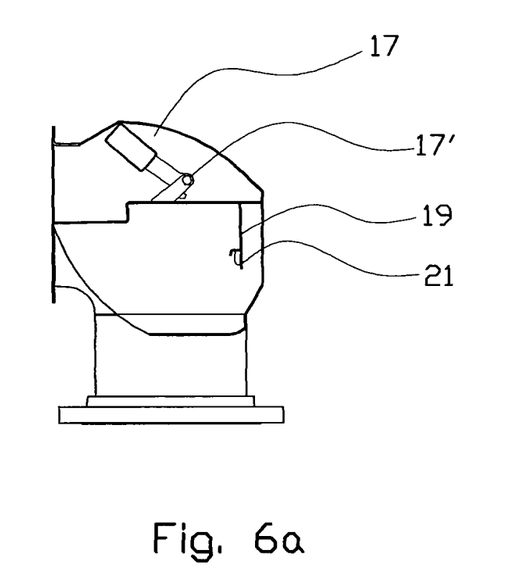
FIG. 6a shows to a larger scale a side view of the filter guard and the bypass arrangement in FIG. 3.
Figure 6B:
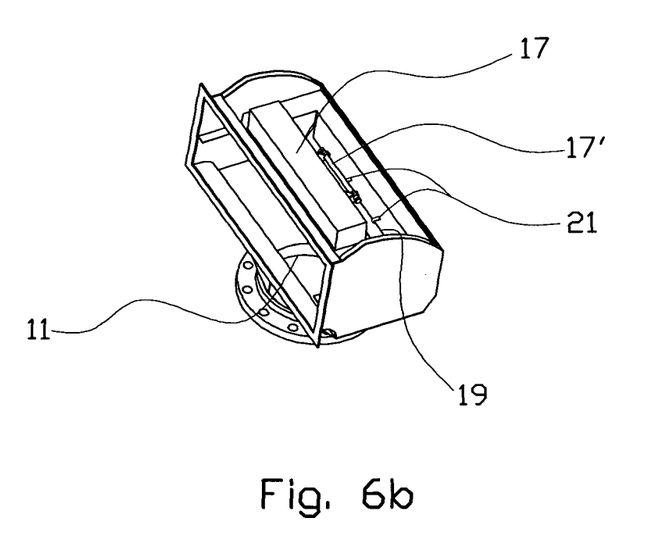
FIG. 6b shows the filter guard and the bypass arrangement in FIG. 6a in perspective.

In FIG. 3 is shown a simplified sectional view of the sieve device shown in FIG. 1 seen through the line 2-2, where a filter guard in the form of a float 17 is in a passive or inactivated, first position. A bypass device constituted by a hinged plate 19 is releasably attached to a float arm 17' by means of an engagement element 21. The engagement element 21 is best seen in FIGS. 6a and 6b. As long as the plate 19 is in engagement with the float arm 17', the plate 19 closes the passage toward the second outlet 11. Fluid being led into the second outlet 11 must therefore first pass through the secondary filter 13.

Figure 4:
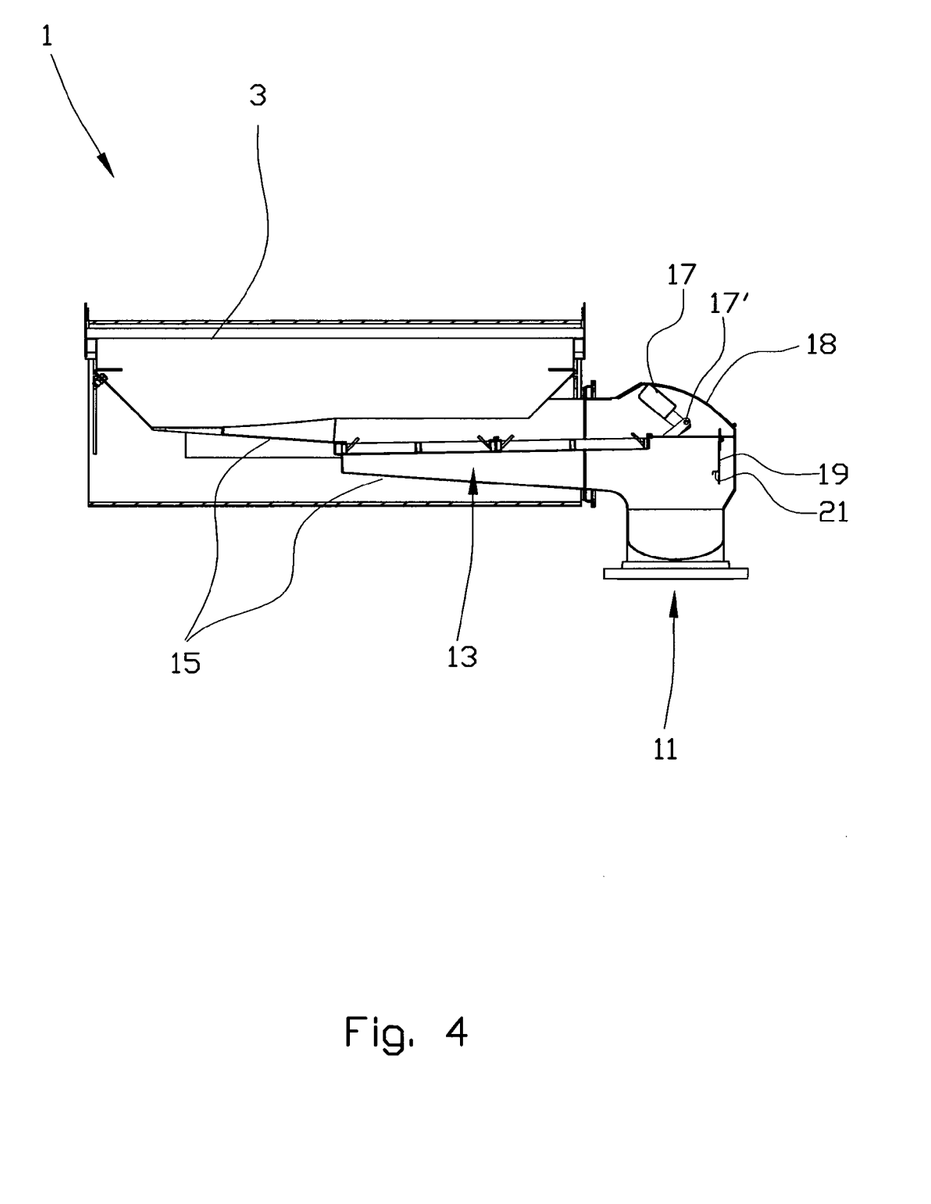
FIG. 4 shows the sieve device of FIG. 3, but where the filter guard is in an open or activated position and where a bypass arrangement is opened for communication between an upstream side of the secondary filter and an outlet for drilling liquid.

The same is shown in FIG. 4 as in FIG. 3, but the secondary filter 13 has been clogged by drill cuttings to such an extent that drilling liquid is also being held back on the secondary filter 13. The float 17 is lifted up, by the drilling liquid, from the first position shown in FIG. 3 by the drilling liquid to a second, upright position as shown in FIG. 4. Moving from the first position to the second position, the engagement element 21 is freed from its engagement with the float arm 17', and the plate 19 being supported in a not shown hinge device, opens for a flow path between an upstream side of the secondary filter 13 and the second outlet opening 11.

The float 17 may be connected to a signal transmitter giving a signal or an alarm when the float 17 is lifted above a certain level by the drilling liquid. Thereby an operator may be warned that the filter is clogged. Action may then be taken in a controlled manner.

Due to the specific gravity of the drill cuttings a substantial portion of the drill cuttings may at least initially, sink to the secondary filter 13 while the drilling liquid is drained through the flow path provided by means of the plate 19 released from its engagement with the float arm 17' and thereby providing an opening for flow. If supply of drilling mud continues, drill cuttings will also gradually be led into the second outlet 11. It may therefore be advantageous if the second outlet 11 is in fluid communication with for example a not shown precipitation tank so that drill cuttings may be separated from the drilling liquid before the drilling liquid continues into the second outlet 11.

Figure 5:
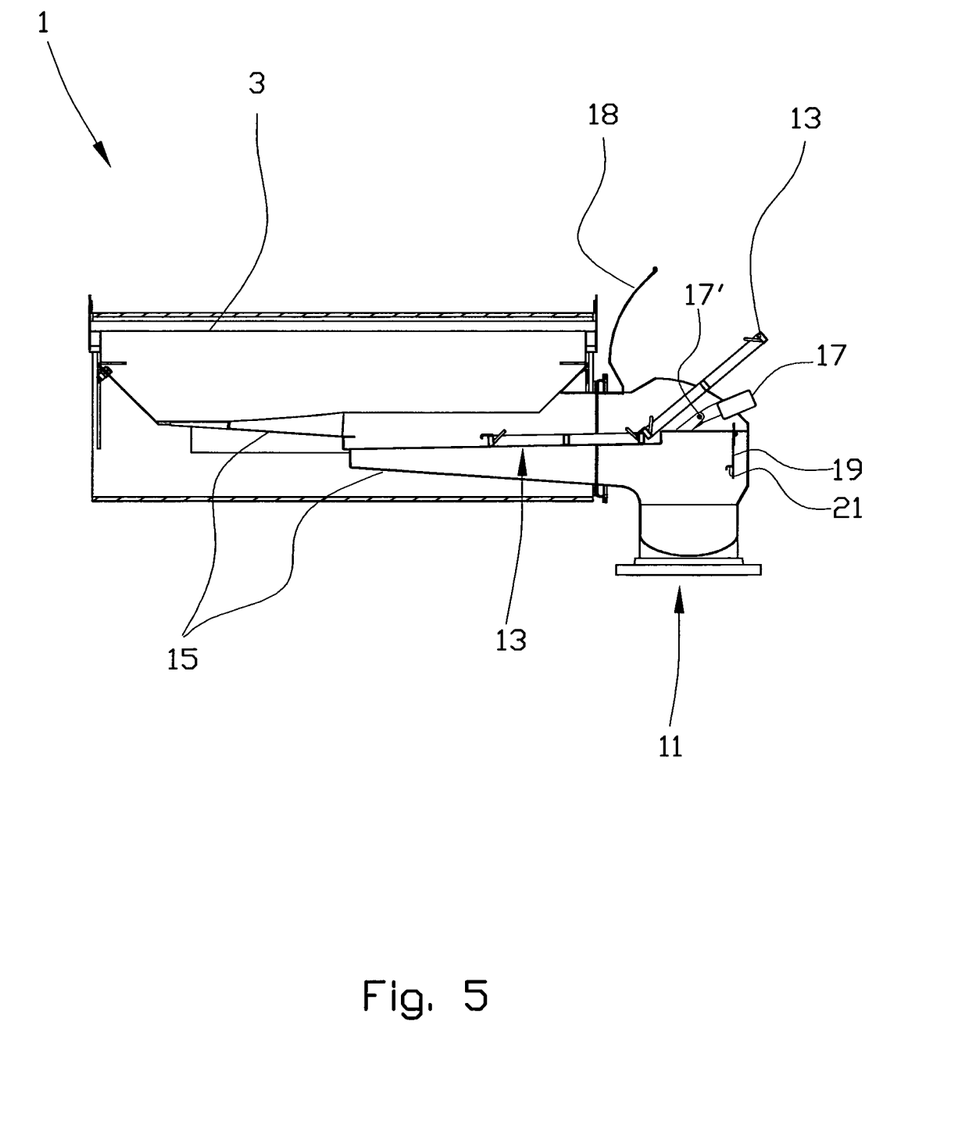
FIG. 5 shows the sieve device of FIG. 4, but where the filter guard is deactivated and where a portion of the secondary filter is in the process of being removed from or installed in the sieve device.

In FIG. 5 is shown a secondary filter 13 in the act of being is removed from or led into the sieve device 1. A lid 18 being a part of a housing enclosing the float 17 and the plate 19 is shown in an open position. In the embodiment shown the secondary filter 13 is provided with vertical walls defining space. The advantage of said space is that it may limit the movement of the drill cuttings on the secondary filter 13.

In a not shown embodiment two filters whereof the one is arranged below the other, constitute the secondary filter 13. Thus one of the two secondary filters may be removed from the sieve device and emptied while the other of the two secondary filters maintains the filtering of the untreated drilling mud. On minor damage to the filter cloth operation may be mainly maintained without any danger for untreated drill cuttings being mixed into the return liquid before it flows into the second outlet 11. This is done by regularly emptying each of the secondary filters 13. It is to be understood that more than two filters may also be placed one above the other.

In the embodiment example the filter guard is shown in the form of a float 17. It is however to be understood that the filter guard in an alternative, not shown embodiment, may be constituted by a weight arranged to be able to be influenced by the mass of drilling liquid and drill cuttings being carried by the secondary filter 13. On registering a mass exceeding a predetermined level, a signal may be given to a driving device arranged to be able to provide an alternative flow path for example of the kind explained in the above embodiment example. The weight may in addition be connected to an alarm.

If the sieve device is based on the use of for example an airflow, the filter guard may, in addition or as an alternative, be based on measuring a pressure differential across the secondary filter 13. On registering a pressure differential exceeding a predetermined level, a signal may be given to a driving device arranged to be able to provide an alternative flow path for example of a kind explained in the above embodiment example. Also in this case a signal to an alarm may be given.

Although the embodiment example is directed to a sieve device including a rotating screening cloth, the invention may also be used for sieve devices of the vibratory type having only one or more stationary screening cloths. In such an application it may be an advantage, but it is not necessary, that the secondary filter is arranged separately from that part of the sieve device being directly connected to the displaced clump weight effecting the shaking movement in the vibratory separator.

The secondary filter according to the present invention thus provides an improved control of the sieve device integrity at the same time as an operator is warned that the screening cloth may be damaged. The secondary filter will provide a possibility to take controlled actions. The secondary filter thus functions as an "auxiliary filter" or a "warning filter".

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is limited only by the scope of the attached claims, including the full range of equivalency to which each element thereof is entitled.

The invention claimed is:

1. A sieve device (1) for untreated drilling mud containing drilling liquid and drill cuttings being brought up from a well, the sieve device (1) comprising:
   a filter device (3) arranged to separate a share of the drilling liquid from the drill cuttings;
   a first outlet arranged to receive drill cuttings held back on the filter device (3);
   a second outlet (11) arranged to receive the drilling liquid that has flowed through the filter device (3) and been led to the second outlet (11) via a channel (15);
   at least one secondary filter (13) arranged to receive untreated drilling mud and to separate drill cuttings from drilling liquid when the filter device (3) is damaged, where the secondary filter (13) is arranged in said channel (15) in such a way that drilling liquid is led through the secondary filter (13) and on to said second outlet (11);
   a filter guard (17) arranged in connection with the secondary filter (13); and a bypass device (19), which by means of the filter guard (17) is arranged to open a flow path between an upstream side of the secondary filter (13) and said second outlet (11) for untreated drilling mud being held back on the secondary filter (13) when material such as drill cuttings clog the secondary filter, where the filter guard (17) is controlled by selection of one or a combination from the group consisting of: a pressure difference upstream and downstream of the secondary filter (13); a weight of material held back on the secondary filter (13); or a volume of material held back on the secondary filter (13).

2. A sieve device according to claim 1, where at least a portion of the secondary filter (13) is arranged within a footprint determined by the filter device (3).

3. A sieve device according to claim 1, where the filter device (3) includes a filter cloth arranged to rotate about two spaced apart positioned turning rollers (5).

4. A sieve device according to claim 1, where the secondary filter (13) is constituted by at least two filters, one arranged below the other.

5. A method to keep control of the integrity of a filter device (3) in a sieve device (1) arranged to separate a share of a drilling liquid in an untreated drilling mud from drill cuttings in the untreated drilling mud, said method comprising the following steps:
  connecting the sieve device (1) to a first outlet arranged to receive the drill cuttings being held back on the filter device (3);
  arranging a second outlet (11) to receive the drilling liquid flowing through the filter device (3) and being led to the second outlet (11) via a channel (15);
  registering untreated drilling mud being held back on or by a secondary filter (13) when the filter device (3) is damaged; and
  when the secondary filter has been clogged by material such as drill cuttings and the weight or volume of untreated drilling mud being held back on or by the secondary filter (13) exceeds a limit value, or fluid flow through the secondary filter becomes less than a limit value, opening a flow path for communication of the untreated drilling mud between an upstream side of the secondary filter (13) and the second outlet (11).

6. A method according to claim 5, where the method further comprises arranging a precipitation tank in connection with the second outlet (11).

* * * * *